Oct. 3, 1967

D. W. PETERSEN ETAL 3,345,109

AIRPLANE DISC BRAKE AND KEY COMBINATION

Filed Oct. 22, 1965

INVENTORS.
DON W. PETERSEN
JAMES J. KOVAC
JOSEPH W. CALVIN
VALENTIN C. PUSE

BY

*J. B. Holden*
ATTY.

United States Patent Office 3,345,109
Patented Oct. 3, 1967

3,345,109
AIRPLANE DISC BRAKE AND KEY
COMBINATION
Don W. Peterson, North Canton, James J. Kovac, Akron, Joseph W. Calvin, Canton, and Valentin C. Puse, Cuyahoga Falls, Ohio, assignors to The Goodyear Tire & Rubber Company, Akron, Ohio, a corporation of Ohio
Filed Oct. 22, 1965, Ser. No. 500,521
2 Claims. (Cl. 301—6)

This invention relates to an improved key construction for splining steel brake discs to an airplane wheel of cast or forged magnesium or other light metal.

Heretofore there have been various types and kinds of key combinations for mounting a steel brake disc or discs on a cast light metal airplane wheel. These keys are generally of steel and are secured to the cast wheel by screws thus forming threaded joints with dissimilar metals and associated corrosion and stress concentrated problems. In addition to the problems due to the dissimilar metals, the screw-on keys also require an additional number of parts, relatively close tolerances, greater assembly time, and with increased maintenance needed to keep the wheel assembly in working condition. The plurality of screw-on keys required around a wheel are heavy and do not allow for proper brake space within some wheels.

It is the general object of the invention to overcome the stated difficulties in the prior art by providing a better and less expensive splining of steel brake discs on cast light metal airplane wheels and wherein shell keys of steel are slipped over key bosses cast in the light metal wheel to provide long wear and strong surfaces for rotatably driving a brake disc or discs with the wheel while allowing axial movement of the discs on the wheel. The stamped shell keys are secured to the key bosses without need for a threaded attachment.

It is a further object of the invention to provide a shell key which replaces expensive and complicated screwed on keys and reduces the number of required parts, weight, close tolerance requirements, and assembly and maintenance time.

Another object of the invention is to provide a plurality of steel stampings, which are substantially U-shaped in cross section, each stamping being slidably received in complementary relation by an axially directed integrally cast key boss extending radially from the cast wheel. Each key boss has a T-shape in cross section permitting the U-shaped stamping to be slid onto and locked in a fixed sliding relationship thereon.

Another object of the invention is the provision of simple means to lock each shell key to the cast key boss.

The foregoing and other objects which will become apparent as the description proceeds are achieved by providing in a wheel assembly and brake, the combination of a cast light metal wheel, a plurality of elongated key bosses, integrally cast with said wheel extending radially of said wheel, each boss having a T-shape in cross section and having a radially directed slot cut perpendicular to its elongated length, a plurality of steel stampings, substantially U-shape in cross section, each slidably received in complementary relation by a key boss, each stamping having an elongated spring clip formed as a part of the top surface thereof and bent normal to the stamping and received in the slot cut in each boss, thereby locking said stamping in fixed sliding relation to said key boss, and at least one steel brake disc splined on the keys provided by the shell stampings.

For a better understanding of the invention, reference should be had to the following drawings, wherein.

Figure 1:
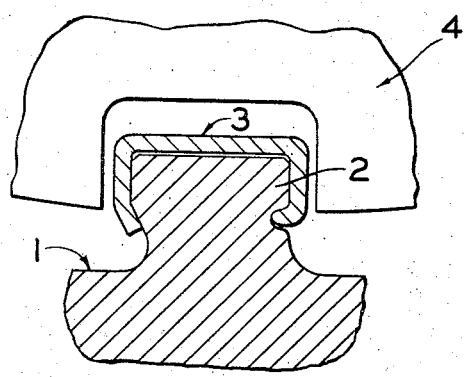
FIGURE 1 is a fragmentary cross sectional view of an airplane wheel and brake combination illustrating one embodiment of the invention.

With particular reference to the drawings, the numeral 1 generally indicates a partially broken away wheel which is rotatably secured to an axle (not shown in the drawing). The wheel is typically an airplane wheel cast from light metal such as magnesium or aluminum or alloys thereof. Extending radially and directed axially from the circumference of the wheel housing 1, are a plurality (only one shown) of circumferentially spaced elongated key bosses 2. In one best known form of the invention the key bosses 2 extend radially inward from the inner circumference of the wheel or a flange thereof. The key bosses 2 are formed as an integral cast part of the wheel 1. As illustrated in FIGURE 1, each key boss 2 has an undercut form of substantially T-shape, or half block-I form in cross section. The purpose of such a particular form is to permit a sheet steel stamping 3 or shell key to be slidably received in complementary and surrounding relation by the key boss 2. The shell key 3 has substantially a U-shaped form in cross section with the edges thereof being extended around enlarged top and into the undercuts of the key boss 2. The shell key 3 is generally made of a sheet steel or any other hard metal which provides a stronger surface with longer wear for splined engagement with a brake disc 4, partially broken away in FIGURE 1. The splined engagement of the brake disc 4 with the wheel 1 rotatably carries the parts with each other, but allows for axial movement of the disc on the wheel which is necessary during the braking action.

Figure 2:
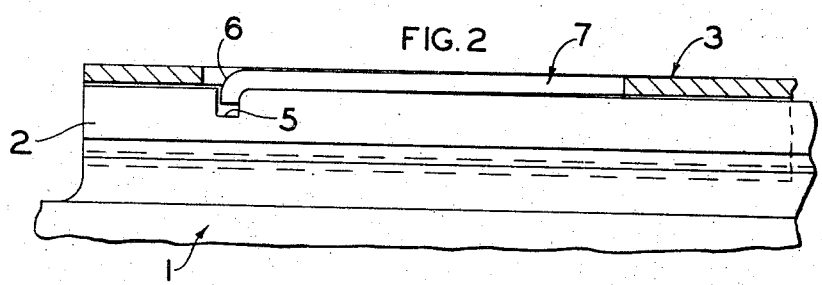
FIGURE 2 is a broken away side elevational view of the cast wheel and key boss of FIGURE 1, and with the shell key shown in cross section.

Referring to FIGURE 2, the elongated key boss 2 has a radially directed slot 5 cut therein, said slot being cut perpendicular to the elongated length of the key boss 2. The purpose of such a slot is to receive the bent tip 6 of an elongated spring clip 7 formed as an integral part of the top surface of the shell key 3. The spring clip 7 springs slightly out of the top plane of the key when the shell key 3 is slid longitudinally along the elongated length of the key boss 2 until it covers the entire top and sides of the key boss, whereupon the bent tip 6 of the spring clip 7 snaps into the slot 5 (see FIG. 2), locking the shell key 3 in fixed relation to the key boss 2.

Figure 3:
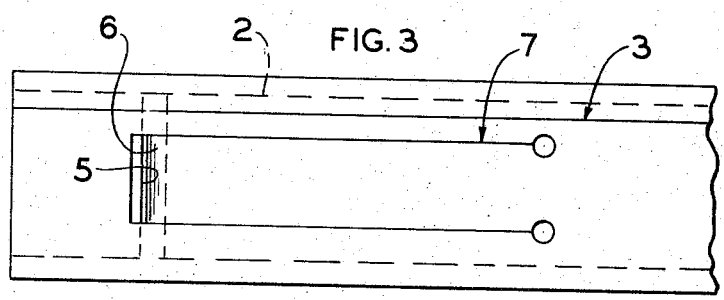
FIGURE 3 is a broken away plan view of FIGURE 2.

FIGURE 3 is a plan view of FIGURE 2 illustrating the spring clip 7 of the shell key 3. The spring clip 7 permits the shell key to be quickly mounted on the key boss 2 and yet to be securely held against slippage with the key boss 2 during the use of the assembly. The spring clip 7 also permits the shell key 3 to be removed after long use and wear results, and the invention allows the inserting of a new shell key into relationship between the disc 4 and the key boss 2 in order to prolong the life of the wheel assembly. Thus, the life of any wheel assembly material is prolonged even though it may be titanium, for example. As distinct from the operation of the invention as described, conventional keys are too often treated as a permanent installation due to the fact that they are not easily removed.

While a certain representative embodiment and details have been shown for the purpose of illustrating the invention, it will be apparent to those skilled in this art that various changes and modifications may be made therein without departing from the spirit or scope of the invention.

What is claimed is:
1. The combination of
a wheel cast of light weight metal,
a plurality of circumferentially spaced elongated key bosses, integrally formed with said wheel extending radially from the circumference of said wheel, each boss having an undercut form in cross section and having a radially directed slot cut perpendicular to its elongated length.

a plurality of sheet steel shell key stampings, substantially U-shape in cross section, each slidably received on and around a key boss, each stamping having an elongated spring clip formed as a normally flat and planar part of the top surface thereof and having an end bent substantially perpendicular to the top surface snapping in the slot cut in each boss as the stamping is slid along the elongated length of the key boss so the clip remains substantially in planar to the top surface thereof, thereby locking said stamping in fixed relation to said key boss, and at least one steel disc splined on the shell key stampings.

2. The combination of a wheel, a plurality of key bosses, integrally formed with said wheel and extending radially inwardly from the inner circumference of said wheel, each boss having a half-block-I form in cross section and having a radially directed slot being cut perpendicular to its elongated length, a brake disc, having corresponding openings cut therein to receive said key bosses so said brake disc is keyed to rotate with said wheel, and a plurality of steel stampings, substantially U-shape in cross section, each slidably received by a key boss in the openings in said brake disc, each stamping having an elongated spring clip with a bent tip in normally planar relation to the top surface which springs slightly out of the top plane of the stamping as it is slid longitudinally along the elongated length of the key boss, the bent tip of the spring clip snapping into the slot on the key boss to lock the stamping in fixed relation on the key boss.

References Cited

UNITED STATES PATENTS

| 1,683,806 | 9/1928 | Richards | 192—69 |
| 2,875,553 | 3/1959 | Albright | 301—6 X |
| 3,138,406 | 6/1964 | Chamberlain | 301—6 |
| 3,191,735 | 6/1965 | Wavak. | |
| 3,266,853 | 8/1966 | Körner | 305—55 X |

BENJAMIN HERSH, *Primary Examiner.*

RICHARD J. JOHNSON, *Examiner.*